US007726335B2

(12) United States Patent
Doble

(10) Patent No.: US 7,726,335 B2

(45) Date of Patent: Jun. 1, 2010

(54) CHECK VALVE APPARATUS FOR FUEL DELIVERY SYSTEMS

(75) Inventor: Cory J. Doble, Caro, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 184 days.

(21) Appl. No.: 11/117,837

(22) Filed: Apr. 29, 2005

(65) Prior Publication Data

US 2006/0243329 A1 Nov. 2, 2006

(51) Int. Cl.
*F16K 21/04* (2006.01)

(52) U.S. Cl. ........................ 137/542; 137/543; 251/360; 251/364

(58) Field of Classification Search ................. 137/542, 137/543, 359; 251/360, 364, 359
See application file for complete search history.

(56) References Cited

U.S. PATENT DOCUMENTS 2,210,046 A * 8/1940 Schubring ................... 251/364
2,344,657 A * 3/1944 Thiel .......................... 251/360
2,350,905 A * 6/1944 Koehler ...................... 251/336
3,176,713 A * 4/1965 McDermott et al. .... 137/533.15
3,191,905 A * 6/1965 Brown ..................... 251/149.5
3,443,789 A * 5/1969 Bucklin et al. .............. 251/214
3,945,607 A * 3/1976 Dashner ...................... 251/357
4,271,862 A * 6/1981 Snoek ........................ 137/511
4,862,913 A * 9/1989 Wildfang .................... 137/543
4,964,391 A 10/1990 Hoover
5,067,449 A * 11/1991 Bonde ........................ 137/854
5,195,552 A * 3/1993 Nehm ......................... 137/269
5,370,150 A * 12/1994 Nehm ...................... 137/454.2
5,406,922 A * 4/1995 Tuckey ....................... 123/497
5,421,306 A 6/1995 Talaski
5,623,910 A 4/1997 Riggle
5,758,682 A * 6/1998 Cain ..................... 137/543.13
6,352,067 B1 3/2002 Genslak
6,971,405 B2 * 12/2005 Pickelman .................. 137/540
6,994,108 B2 * 2/2006 Roth et al. .................. 137/541
2004/0069353 A1 * 4/2004 Pickelman .................. 137/540

* cited by examiner

*Primary Examiner*—John Rivell
*Assistant Examiner*—Craig Price
(74) *Attorney, Agent, or Firm*—Reising Ethington P.C.

(57) ABSTRACT

A check valve for a combustion engine fuel system includes a polymeric poppet valve including a valve stem and a valve head that terminates the valve stem. A valve seat is adapted for cooperation with the valve head of the poppet valve, and includes a valve seat body and an elastomeric valve seat seal supported by the valve seat body and adapted for sealing against the valve head of the poppet valve. The check valve is particularly adapted for use with a fuel pump within a fuel system.

20 Claims, 4 Drawing Sheets

CHECK VALVE APPARATUS FOR FUEL DELIVERY SYSTEMS

FIELD OF THE INVENTION

This invention relates generally to fuel delivery systems, and more particularly to an improved check valve apparatus for a fuel delivery system for an internal combustion engine.

BACKGROUND OF THE INVENTION

Fuel delivery systems typically include a fuel pump for delivering fuel under pressure from a fuel tank to an internal combustion engine. A check valve is usually positioned in line between the fuel pump and the engine to prevent back flow of fuel from the engine to the fuel pump when the fuel pump is deactivated. Fuel pressure is thereby maintained at the engine, resulting in reduced start-up time and improved starting of the engine. As depicted in FIG. 8, a conventional check valve apparatus 112 includes a screw-machined brass valve seat 144 and brass poppet valve 142 that has a rubber tip 143 molded thereto for sealing against the valve seat 144.

Unfortunately, however, the conventional check valve apparatus has several shortcomings. First, the screw machining process required to make the valve seat and poppet valve is particularly time-consuming and costly. Second, brass is a relatively heavy and costly material. Third, the process used to mold the rubber tip to the poppet valve is relatively expensive. Fourth, in fuel systems where fuel pump speed adjusts to engine fuel demand, a valve assembly having a brass poppet valve has relatively low responsiveness to rapidly changing fuel pressure and demand conditions such as when a vehicle is accelerating, decelerating, or shifting gears, because of the relatively high mass of a brass poppet valve.

SUMMARY OF THE INVENTION

In one embodiment, a check valve apparatus includes a poppet valve that is composed of a polymeric material and has a valve stem and a valve head adjacent one end of the valve stem. A valve seat is adapted for cooperation with the valve head of the poppet valve. The valve seat includes a valve seat body and a valve seat seal supported by the valve seat body. The valve seat seal is composed of an elastomeric material that is adapted for sealing against the valve head of the poppet valve. In other embodiments, the check valve apparatus is adapted for use with a fuel pump module within a fuel system.

At least some of the objects, features and advantages that may be achieved by at least certain embodiments of the invention include providing a check valve apparatus that is readily adaptable to various fluid flow applications including fuel pumps and fuel systems, responsive to rapidly changing fluid pressure conditions, wherein the check valve apparatus yields a reduction in product weight and cost, performs as well or better than conventional designs, and is of relatively simple design and economical manufacture and assembly, is rugged, durable, and reliable, and in service has a long, useful life.

Of course, other objects, features and advantages will be apparent in view of this disclosure to those skilled in the art. Various other fluid systems embodying the invention may achieve more or less than the noted objects, features or advantages.

BRIEF DESCRIPTION OF THE DRAWINGS

These and other objects, features and advantages of the present invention will be apparent from the following detailed description of the preferred embodiment(s) and best mode, appended claims, and accompanying drawings in which:

DETAILED DESCRIPTION OF THE PREFERRED EMBODIMENTS

Figure 1:
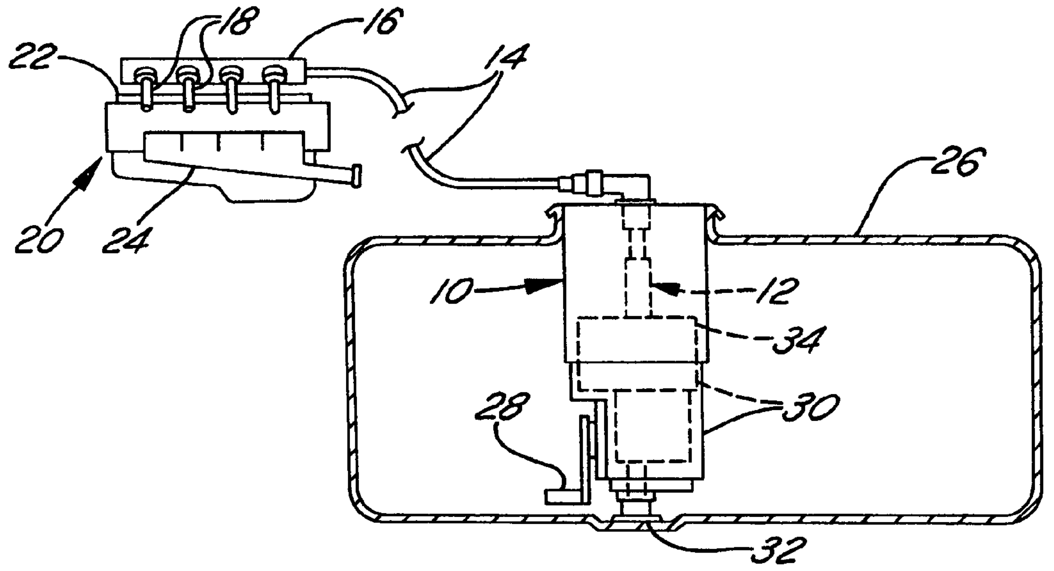
FIG. 1 is a schematic view illustrating a preferred exemplary embodiment of a fuel system including a preferred exemplary fuel pump module having a preferred exemplary check valve assembly.

Referring in detail to the drawings, FIG. 1 illustrates a fuel system having a fuel pump module 10 with an integrated valve assembly 12, according to a preferred exemplary embodiment. The valve assembly 12 is connected by a fuel line 14 to a fuel rail 16 and associated fuel injectors 18 of an internal combustion engine 20 having an air intake manifold 22 and an exhaust manifold 24. The valve assembly 12 functions as a check valve for permitting free flow of fuel from the pump module 10 to the fuel rail 16 as required by the engine when the pump module 10 is operating, and for preventing back-flow of fuel from the fuel rail 16 to the pump module 10 when the engine and pump module 10 are shut off.

The pump module 10 is mounted in a fuel tank 26 and has a fuel level sensor 28 and a fuel pump 30 with an outlet connected to the valve assembly 12 and an inlet communicating with the bottom of the tank through a fuel filter 32. The pump 30 is driven by an electric motor 34, which may either operated at a substantially constant speed or its speed normally may be varied to control the flow of fuel delivered by the pump 30 to the engine 20. The fuel system has no fuel return line from the engine 20 to the fuel tank 26 and hence is of the type often referred to as a "no-return" or "returnless" fuel system. Alternatively, however, those of ordinary skill in the art will recognize that the preferred exemplary fuel module and check valve assembly are also adaptable for use with a return-style fuel system if desired.

Figure 2:
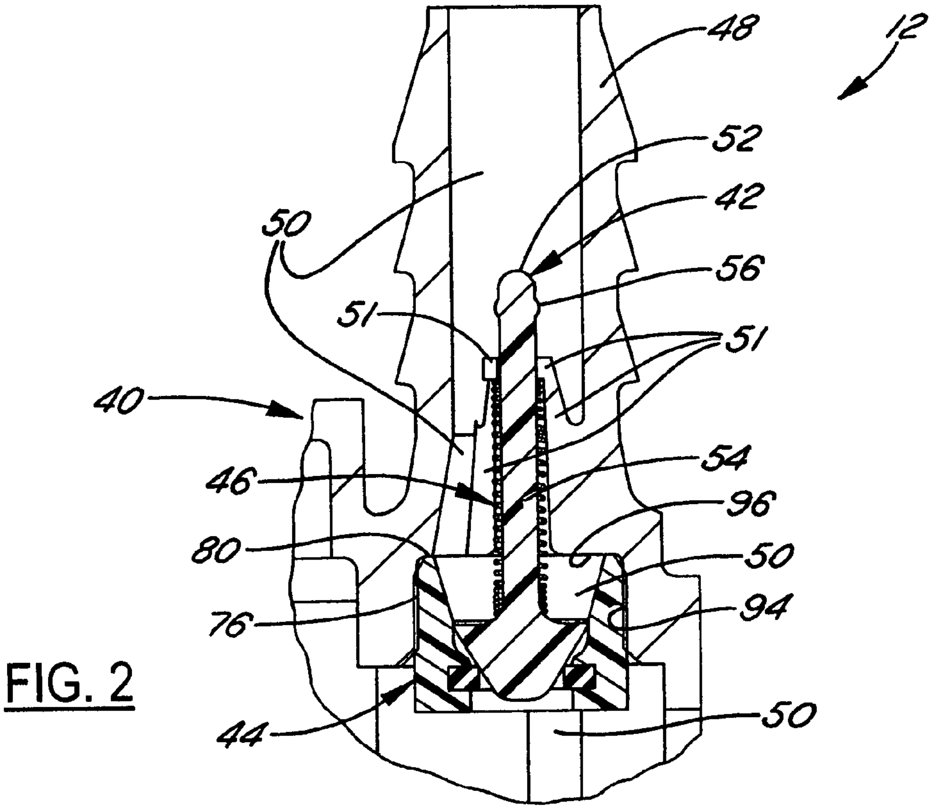
FIG. 2 is an enlarged cross-sectional view of the check valve assembly including a poppet valve and valve seat in a portion of the fuel pump module of FIG. 1.

FIG. 2 illustrates an enlarged view of the valve assembly 12, which generally includes a valve body 40 for housing a poppet valve 42, a valve seat 44 cooperating with the poppet valve 42, and any suitable spring, such as a compression spring 46, for yieldably biasing the poppet valve 42 against the valve seat 44. The pre-load force produced by the spring 46 is selected so that the poppet valve 42 will open at a relatively low pressure, preferably on the order of about 2-5 psi.

The valve body 40 is preferably integral with an outlet cover of the fuel pump module 10 of FIG. 1. In other words, the valve body 40 may just be a portion of such an outlet cover. Alternatively, however, the valve body 40 could be a separate component that is assembled to the outlet cover or some other part of the fuel system. The valve body 40 includes a nipple 48 that is preferably barbed for connecting to the fuel line 14 of FIG. 1. The barbed nipple 48 defines a fluid passage 50 for conducting pressurized fuel therethrough, and includes an integrally molded keeper 51 that is used for slidably retaining the poppet valve 42. The valve body 40 may be composed of any suitable material including any suitable synthetic resin or any other material suitable for use in the manufacture of fuel pump outlet covers or separate valve bodies.

Figure 3:
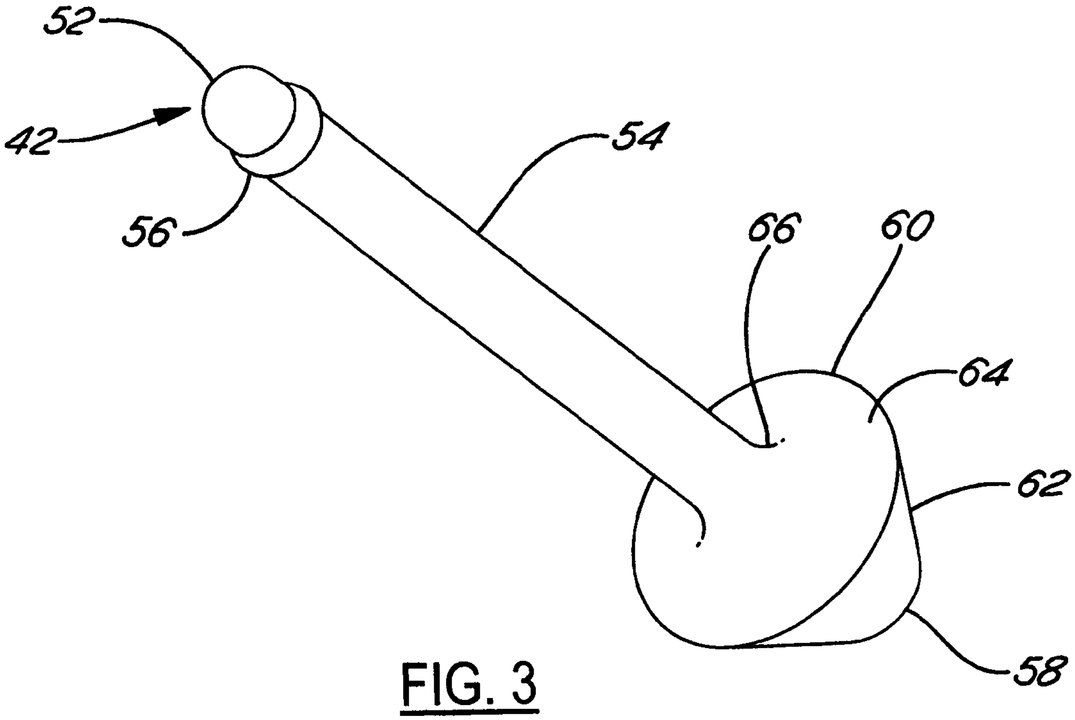
FIG. 3 is an enlarged perspective view of the poppet valve of FIG. 2.

As shown in FIG. 3, the poppet valve 42 includes a first end 52 and an elongated and generally cylindrical stem 54 that may include an enlarged portion 56 proximate the first end 52 that may function as a retention feature as will be explained in further detail herein below. The valve 42 extends longitudinally from the first end 52 along the valve stem 54 and terminates in a second end 58, with a valve head 60 substantially interposed between the stem 54 and the second end 58. The valve head 60 includes a conical portion 62 that extends from the second end 58 and terminates at a shoulder 64 of the valve head 60. A fillet 66 is provided as a transition between the shoulder 64 of the valve head 60 and the stem 54.

The poppet valve 42 may be composed of any suitable material or materials. For example, the poppet valve 42 may be composed entirely of polymeric material or materials. As defined herein, polymeric material(s) generally means relatively high-molecular-weight materials of either synthetic or natural origin and may include thermosets and thermoplastics. For use in fuel systems, the polymeric material should have a high resistance to swelling and degradation when in long term contact with liquid hydrocarbon fuels. In particular, the poppet valve 42 may preferably be composed of polyphenylene sulfide (PPS), polyoxymethylene (POM) acetal copolymer, or the like. In another example, the valve stem 54 may be composed of a metal or metallic material such as steel, iron, brass, aluminum, magnesium, or the like, whereas the valve head 60 may be composed of a polymeric material such as PPS, POM, or the like, wherein the stem 54 and head 60 are pressed together, molded together, or the like.

Figure 4:
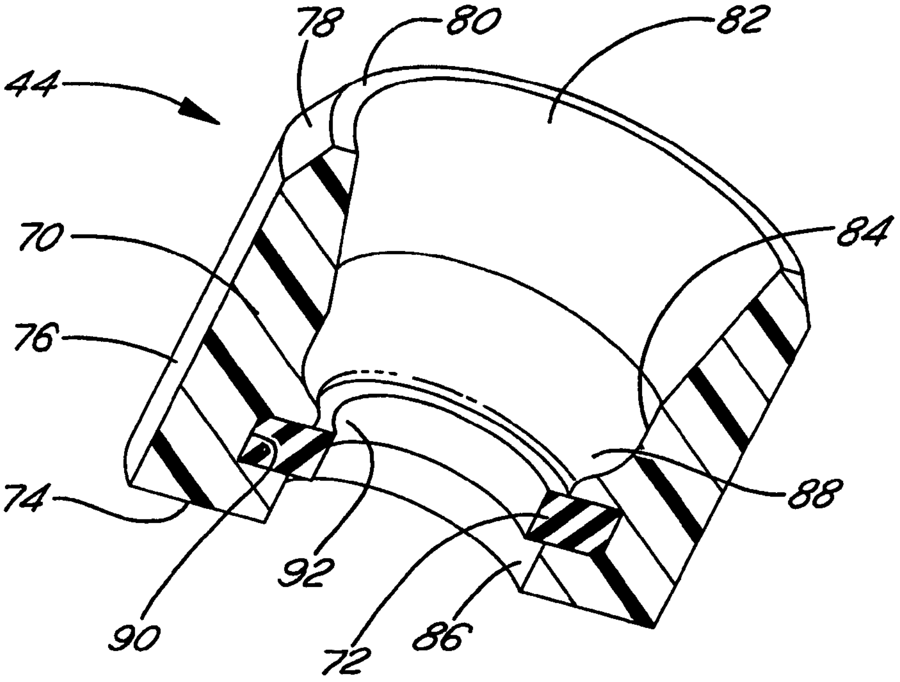
FIG. 4 is an enlarged, cross-sectional, perspective view of the valve seat of FIG. 2.

FIG. 4 illustrates a cross-sectional perspective view of the valve seat 44, which includes a valve seat body 70 that supports a valve seat seal 72. Externally, the valve seat body 70 is generally annular in shape and includes a base surface 74, and outer cylindrical surface 76 that extends from the base surface 74 and terminates in a chamfered surface 78, which terminates in a locating surface 80. Internally, the valve seat body 70 includes a through passage that communicates with the fluid passage 50 of the valve body 40 of FIG. 2. The through passage is defined by a conical surface 82 that terminates in a first cylindrical surface 84, which transitions to a second cylindrical surface 86 via a curved or radiused surface 88. It is contemplated that the valve seat body 70 could be integrated into a larger overall housing, such as an outlet cover of a fuel pump module, and that the integrally molded keeper 51 could instead be a separately assembled component for retaining the poppet valve 42. In other words, a portion of the outlet cover itself could be the valve seat body, thereby incorporating the features and advantages of the valve seat body 70, wherein the valve seat seal 72 would be supported by a portion of the outlet cover itself. Conversely, the keeper 51 could be separately assembled to the outlet cover after the valve 42 is assembled to the outlet cover. Accordingly, any alternative variations involving integrating or separating the above-described components, or any others discussed herein, are captured by the spirit and scope of the claims.

The valve seat seal 72 is supported in any suitable manner by the valve seat body 70. Preferably, however, the valve seat seal 72 is supported by the valve seat body 70 within the through passage, for example, in the second cylindrical surface 86 as shown. Accordingly, a groove 90 may be provided in the valve seat body 70 to accommodate the valve seat seal 72. Accordingly, the valve seat seal 72 is preferably of annular shape with a rectilinear, and preferably rectangular, cross section as shown. The valve seat seal 72 preferably includes an inner diameter 92 that is smaller in size than that of the second cylindrical surface 86 of the valve seat body 70. Alternatively, the valve seat seal 72 could simply rest supported on some surface of the valve seat body 70 and need not be interengaged thereto as shown.

The valve seat 44 may be manufactured by any suitable method. For example, the valve seat seal 72 may be co-molded (or co-injection molded) with the valve seat body 70, over-molded (or insert-molded) onto the valve seat body 70, or molded according to any other suitable molding method. Alternatively, the valve seat body 70 may first be injection molded and the valve seat seal 72 assembled and/or adhered to the valve seat body 70 in a subsequent manufacturing step. If separately assembled or adhered, the valve seat seal 72 may be a molded O-ring, die cut ring, or the like, preferably with a suitable rectilinear cross section such as rectangular or square cross section.

Generally, however, co-molding and over-molding methods are well known to those of ordinary skill in the art. If co-molding, over-molding, or like methods are used, it is generally desirable that the polymer used to form the valve seat seal 72 be compatible with, and capable of adhering to, the polymer used to form the supporting valve seat body 70.

Suitable combinations of polymers are well known in the art of polymer molding and the valve seat 44 may be composed of any such suitable polymeric materials. For example, the valve seat body 70 is preferably composed of any suitable thermosets or thermoplastics, such as PPS, POM, or the like, while the valve seat seal 72 is preferably composed of any suitable elastomeric material. As defined herein, elastomeric generally means a material, which at room temperature, can be stretched under low stress to about twice its original length or more and, upon release of the stress, will return with force to its approximate original length. Elastomeric also encompasses any of various elastic substances resembling rubber, such as a fluorocarbon like Viton®, a nitrile such as acrylonitrile-butadiene, or the like. In general, the materials used for the components may be selected based on their dimensional stability in warm and cold flexible fuel environments.

According to one insert-molding process, the valve seat seal 72 is pre-formed and the valve seat body 70 is formed thereover. In fact, it may be generally advantageous to over-mold the polymer of the valve seat body 70 to the pre-formed valve seat seal 72 before the polymer of the valve seat seal 72 has completely cooled. This process avoids the need to manually mount, paste, or use an adhesive to adhere the valve seat seal 72 to the valve seat body 70. In any case, the preformed valve seat seal 72 is either manually or robotically assembled onto a specific predetermined location on a core pin of an injection molding machine. Mold halves of the injection molding machine close around the core pin. Molten plastic is injected into a mold cavity that is defined by the closed mold halves, the core pin, and the valve seat seal 72, wherein the molten plastic forms the valve seat body 70 in the shape of the mold cavity. After molding, the mold halves separate or open and the core pin retracts, leaving the valve seat seal 72 intact within the valve seat body 70 to create the valve seat 44. The valve seat 44 may then be subjected to any desired finish operations such as deburring, deflashing, or the like and is thereafter ready for assembly into the fuel pump module.

According to an alternative insert-molding process, the valve seat body 70 is preformed and the valve seat seal 72 is formed thereto. In the first step of such an insert-molding process, the polymer that forms the bulk of the valve seat 44 is injected into a first cavity of a mold. The resulting structure is a partially formed valve seat 44 having a valve seat body 70 with an annular recess in the form of the annular groove 90. The partially formed valve seat 44, or valve seat body 70, is then automatically moved into a second cavity within the same or a different mold, where a second material is injected to complete the valve seat 44. The second material is injected into the partially formed valve seat 44 to form the elastomeric seal 72. This second material generally cannot be torn from the valve seat body 70 and remains durable for the lifetime of the valve seat body 44.

Referring again to FIG. 2, the valve assembly 12 may be assembled in any suitable manner. For example, the compression spring 46 is first assembled over the elongated stem 54 of the poppet valve 42. Second, the poppet valve 42 with the spring 46 assembled thereto is inserted into the fluid passage 50 of the valve body 40 such that the first end 52 of the stem 54 of the poppet valve 42 is inserted and forced through a hole or aperture through the keeper 51 wherein the enlarged portion 56 snap fits through the keeper 51. Third, the valve seat body 44 is inserted into the fluid passage 50 of the valve body 40 until the locating end 80 of the valve seat body 44 bears on or locates against a locating shoulder 96 of the valve body 40. Preferably, the valve seat body 44 is inserted with an interference fit wherein the cylindrical outer surface 76 of the valve seat body 44 is slightly larger in diameter than the internal diameter of cylindrical surface 94 of the valve body 40.

Figure 5:
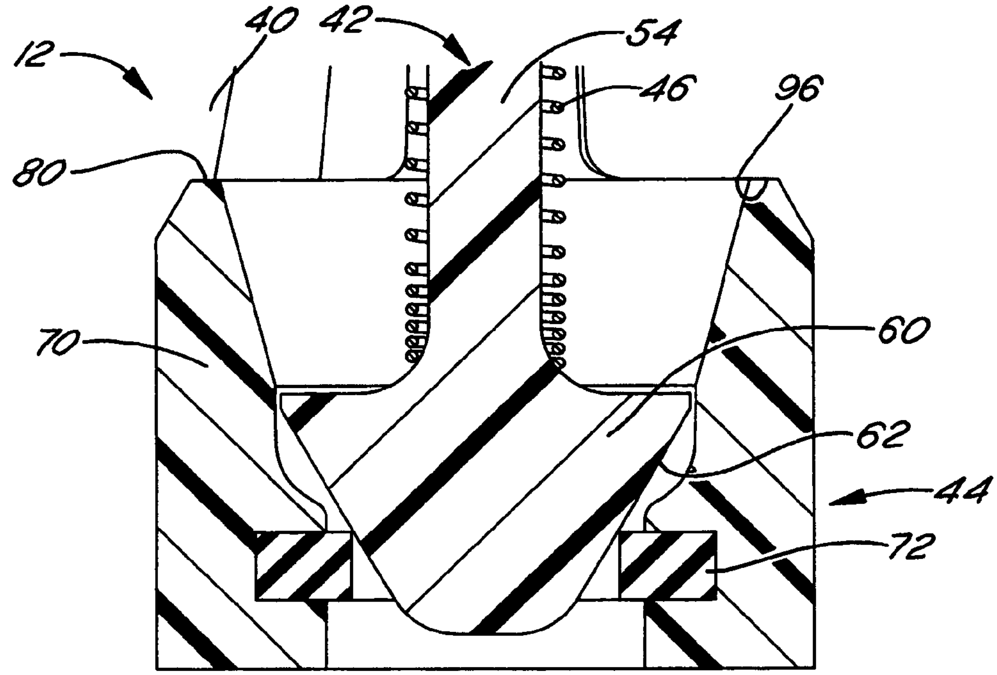
FIG. 5 is an enlarged cross-sectional view of a portion of the check valve assembly of FIG. 2.
Figure 8:
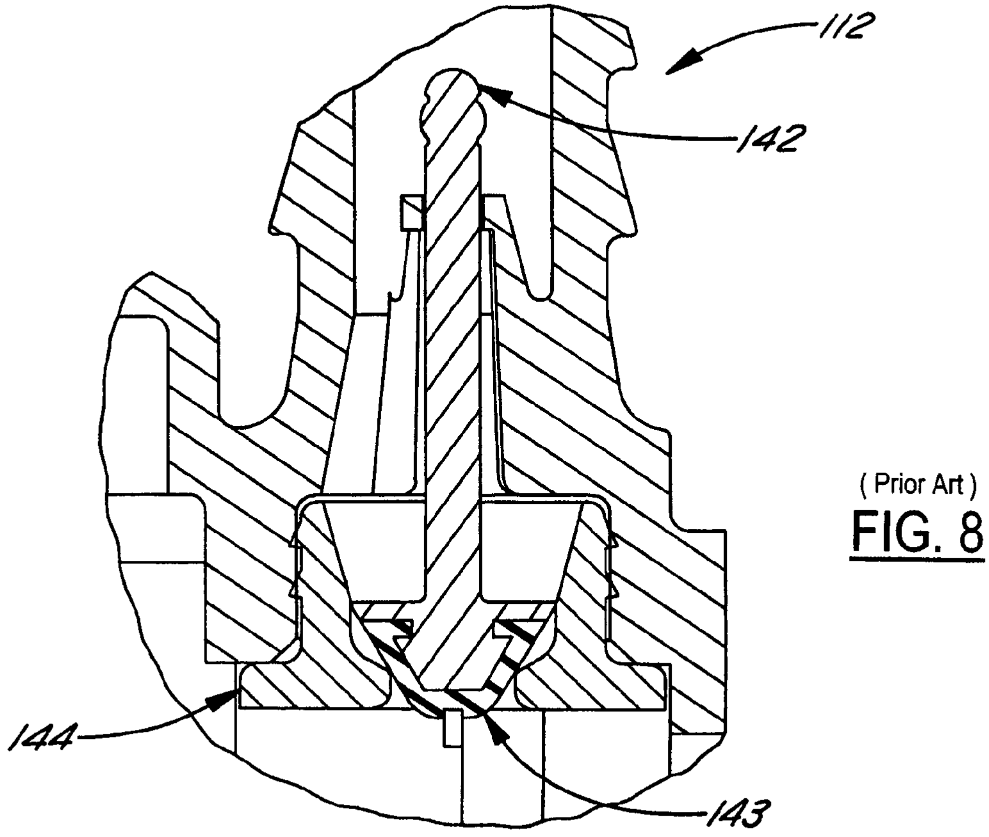
( Prior Art ) FIG. 8
FIG. 8 is a cross-sectional view of a portion of a conventional check valve assembly according to the prior art.

FIG. 5 illustrates an enlarged view of the valve assembly 12, wherein the conical surface 62 of the valve head 60 locates against the valve seat seal 72. Of course, the valve seat seal 72 is flexible, resilient, and otherwise compliant so that when the valve assembly is closed it may deflect sufficiently under the bias force of the spring-loaded poppet valve 42 and under the net force of pressurized fuel acting on the valve to produce a good seal. As shown in FIG. 5, when the valve 12 is closed, the valve head 60 engages only the valve seat seal 72. Preferably, the valve seat seal 72 is fully apertured so as to accept a large portion of the conical valve head 60 for self-centering the poppet valve 42 with regard to the valve seat 44.

Basically, check valves control passage of fluid by the characteristics of the fluid flow itself. In other words, the check valve is controlled in response to a change in the fluid pressure conditions occurring within the system or line wherein the check valve resides. As pressure and flow of fuel from the fuel pump increases, the valve head 60 of the poppet valve 42 is initially lifted from the valve seat seal 72 against the force imposed by the spring 46 to provide a minimum annular space for fluid flow between the valve 42 and valve seat 44. As fuel pressure and flow continue to increase, the valve 42 lifts further away from the valve seat 44 for increased fuel flow through the valve seat 44 and past the valve 42, as described in further detail in U.S. Pat. No. 5,421,306, which is assigned to the assignee hereof and incorporated by reference herein in its entirety. Generally, the valve 42 closes when the force of the spring 46 plus the force produced by fuel acting on the downstream side of the valve 42 exceeds the force on the valve 42 produced by fuel acting on the upstream side of the valve 42.

Figure 6:
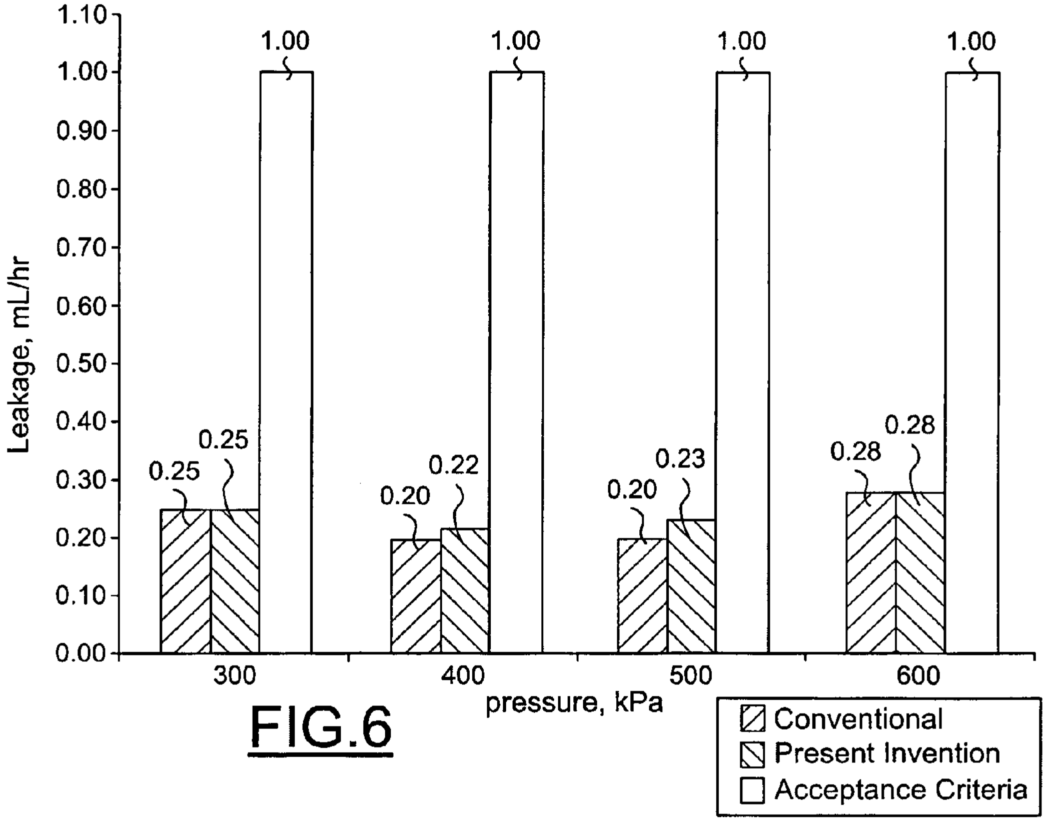
FIG. 6 is a bar chart of reverse leakage test results comparing a conventional valve assembly to the preferred exemplary valve assembly.
Figure 7:
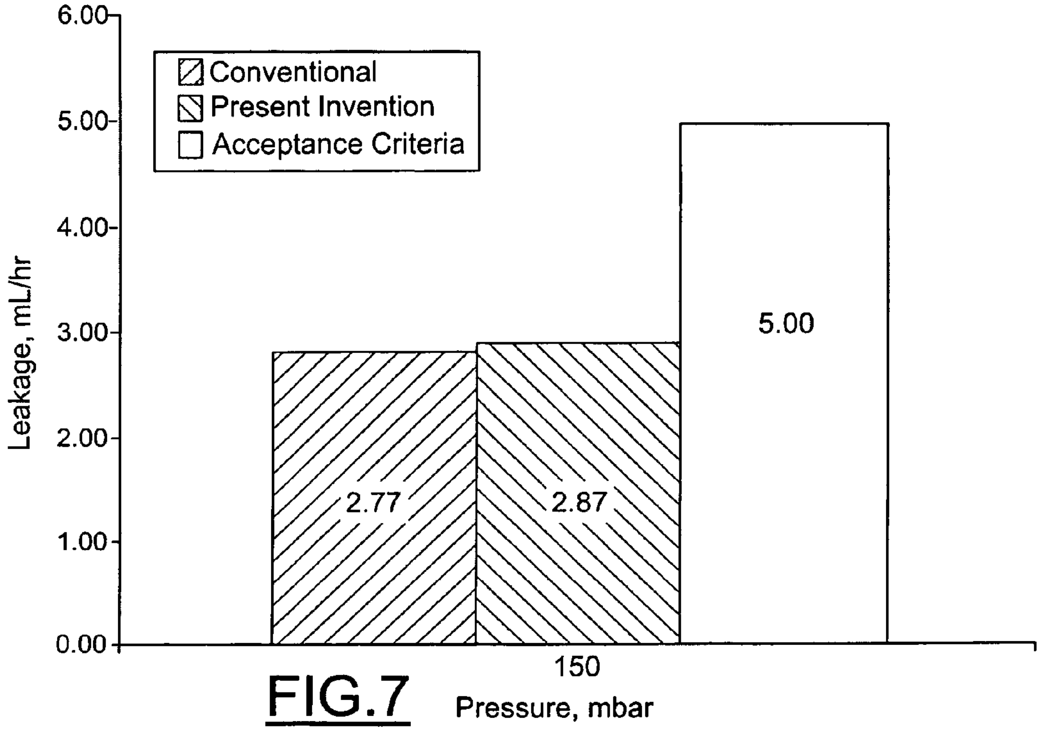
FIG. 7 is a bar chart of forward leakage test results comparing a conventional valve assembly to the preferred exemplary valve assembly.

Referring now to FIGS. 6 and 7, the sealing performance of the preferred exemplary valve assembly is comparable to that of conventional brass poppet valves and valve seats. The preferred exemplary valve assembly was tested head-to-head against a baseline conventional brass valve assembly using an identical test apparatus under identical testing conditions. In FIG. 6, reverse fuel leakage in mL/hr is plotted versus fuel pressure in kPa and standard acceptance criteria values are shown. Reverse leakage is that amount of fuel that is able to flow past the valve assembly in a direction from the engine toward the fuel tank, and is a measure of the ability of the valve assembly after engine and fuel pump shutoff to prevent fuel from flowing back into the fuel tank and thereby keep fuel in the fuel lines for use by the engine at subsequent startup. The preferred exemplary valve assembly performed the same as the conventional brass valve assembly at 300 and 600 kPa and performed nearly the same as the conventional valve assembly at 400 and 500 kPA. In FIG. 7, forward fuel leakage in mL/hr is plotted versus fuel pressure in mbar and a standard acceptance criteria leakage value of 5.00 mL/hr is shown. Forward leakage is that amount of fuel that is able to flow past the valve assembly in a direction from the fuel tank toward the engine, and is a measure of the ability of the valve assembly to keep fuel in the fuel tank if the fuel lines between the fuel pump and engine become disconnected or severed. The preferred exemplary valve assembly performed nearly the same as the conventional valve assembly at 150 mbar. In both the forward and reverse leakage tests, the difference in performance between the preferred exemplary valve assembly and conventional valve assembly is believed to be statistically insignificant and, therefore, negligible. Accordingly, the disclosure sets forth a preferred exemplary check valve that, compared to conventional check valves, is relatively lighter in weight, less expensive, more robust against deterioration by gasoline, alcohol, diesel fuels and their contaminants, and, yet, performs equally as well as conventional check valves.

While the forms of the invention herein disclosed constitute a presently preferred embodiment, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

What is claimed is:

1. A fuel system check valve apparatus, comprising:

a valve body including a through passage;

a poppet valve consisting essentially entirely of a polymeric material and having a valve stem and a valve head adjacent one end of said valve stem, the valve head having a truncated conical portion and a shoulder at the downstream end of the conical portion and integral with the valve head and the entire valve head including the conical portion and the valve stem being in one piece of the polymeric material which is highly resistant to degradation when in long term contact with hydrocarbon fuels, the valve stem being carried by the body and guided for generally axial movement of the valve stem and head relative to the body to open and closed positions of the valve; and a separate valve seat assembly adapted for cooperation with said valve head of said poppet valve, said valve seat assembly including:

a separate valve seat body of polymeric material received with an interference fit at least partially within the through passage of the valve body and fixed relative to the valve body; and a separate valve seat seal with a through passage and received only in and carried by said valve seat body independently of the valve body, said valve seat seal being composed of an elastomeric material constructed for sealing against said conical portion of said valve head of said poppet valve; and the valve seat body having a through passage which downstream of the valve seat seal has a conical surface which merges into a first cylindrical surface which transitions by a curved surface to a second cylindrical surface having an inside diameter smaller than the inside diameter of the first cylindrical surface and the inner diameter of the valve seat seal is smaller than the inside diameter of the second cylindrical surface and when the valve is closed the shoulder of the valve head is axially disposed in the first cylindrical surface and adjacent the conical surface of the valve seat body, and the shoulder has a smaller diameter than the inside diameter of the first cylindrical surface of the valve seat body, and the valve head engages only the separate valve seat seal.

2. The check valve apparatus of claim 1 further comprising:

the valve body having a fluid passage therein, wherein said valve seat and said poppet valve are located at least partially within said fluid passage, said valve body further having a valve stem guide for guiding said valve stem of said poppet valve.

3. The check valve apparatus of claim 2 wherein said valve body is an outlet cover of a fuel pump module.

4. The check valve apparatus of claim 1 further comprising:

a compression spring interposed between a portion of said valve stem guide and said valve head of said poppet valve for urging said poppet valve against said valve seat.

5. The check valve apparatus of claim 1 wherein said valve seat seal is molded to said valve seat body by at least one of a co-molding process or an over-molding process.

6. The check valve apparatus of claim 1 wherein said valve seat body is composed of at least one of PPS or POM.

7. The check valve apparatus of claim 1 wherein said valve seat seal is composed of at least one of a fluorocarbon elastomer or a nitrile elastomer.

8. The check valve apparatus of claim 1 wherein said valve seat seal is assembled to said valve seat body.

9. The check valve apparatus of claim 1 wherein said valve seat is separately assembled to said valve body.

10. A fuel pump module including a check valve apparatus comprising:

a valve body carried by the fuel pump module and including a through passage;

a poppet valve composed entirely of a polymeric material and having a valve stem and a valve head adjacent one end of said valve stem, the valve head having a truncated conical portion and a shoulder at the downstream end of the conical portion and integral with the valve head and the entire valve head including the conical portion and the valve stem being in one piece of the polymeric material which is highly resistant to degradation when in long term contact with hydrocarbon fuels, the valve stem being carried by the body and guided for generally axial movement of the valve stem and head relative to the body to open and closed positions of the valve; and a valve seat assembly adapted for cooperation with said valve head of said poppet valve, said valve seat assembly including:

a separate valve seat body of polymeric material received with an interference fit at least partially within the through passage of the valve body and fixed relative to the valve body, the valve seat body including a through passage and a groove formed within and open to the through passage; and a separate valve seat seal with a through passage and supported by only said valve seat body within said groove, said valve seat seal being composed of an elastomeric material constructed for sealing against said conical portion of said valve head of said poppet valve; and the valve seat body having a through passage which downstream of the valve seat seal has a conical surface which merges into a first cylindrical surface which transitions by a curved surface to a second cylindrical surface having an inside diameter smaller than the inside diameter of the first cylindrical surface and the inner diameter of the valve seat seal is smaller than the inside diameter of the second cylindrical surface and when the valve is closed the shoulder of the valve head is axially disposed in the first cylindrical surface and adjacent the conical surface of the valve seat body and the shoulder has a smaller diameter than the inside diameter of the first cylindrical surface of the valve seat body, and the valve head engages only the separate valve seat seal.

11. The fuel pump module of claim 10 wherein said check valve apparatus further comprises:

the valve body having a fluid passage therein, wherein said valve seat and said poppet valve are located at least partially within said fluid passage, said valve body further having a valve stem guide for guiding said valve stem of said poppet valve.

12. The fuel pump module of claim 11 wherein said check valve apparatus further comprises said valve body being an outlet cover of said fuel pump module.

13. The fuel pump module of claim 11 wherein said check valve apparatus further comprises:

a compression spring interposed between a portion of said valve stem guide and said valve head of said poppet valve for urging said poppet valve against said valve seat.

14. The fuel pump module of claim 10 wherein said valve seat is separately assembled to said valve body.

15. A fuel system including a fuel pump module having a check valve apparatus comprising:

a valve body carried by the fuel pump module and including a through passage;

a poppet valve consisting essentially entirely of a polymeric material and having a valve stem and a valve head adjacent one end of said valve stem, the valve head having a truncated conical portion and a shoulder at the downstream end of the conical portion and integral with the valve head and the entire valve head including the conical portion and the valve stem being in one piece of the polymeric material which is highly resistant to degradation when in long term contact with hydrocarbon fuels, the valve stem being carried by the body and guided for generally axial movement of the valve stem and head relative to the body to open and closed positions of the valve; and a valve seat assembly adapted for cooperation with said valve head of said poppet valve, said valve seat assembly including:

a separate valve seat body of polymeric material received with an interference fit at least partially within the through passage of the valve body and fixed relative to the valve body; and a separate valve seat seal with a through passage and supported only by said valve seat body, said valve seat seal being composed of an elastomeric material constructed for sealing against said conical portion of said valve head of said poppet valve; and the valve seat body having a through passage which downstream of the valve seat seal has a conical surface which merges into a first cylindrical surface which transitions by a curved surface to a second cylindrical surface having an inside diameter smaller than the inside diameter of the first cylindrical surface and the inner diameter of the valve seat seal is smaller than the inside diameter of the second cylindrical surface and when the valve is closed the shoulder of the valve head is axially adjacent the conical surface of the valve seat body and the shoulder has a smaller diameter than the inside diameter of the first cylindrical surface of the valve seat body, and the valve head engages only the separate valve seat seal.

16. The fuel system of claim 15 wherein said check valve apparatus further comprises:

the valve body having a fluid passage therein, wherein said valve seat and said poppet valve are located at least partially within said fluid passage, said valve body further having a valve stem guide for guiding said valve stein of said poppet valve.

17. The fuel system of claim 16 wherein said check valve apparatus further comprises said valve body being an outlet cover of said fuel pump module.

18. The fuel system of claim 16 wherein said check valve apparatus further comprises:

a compression spring interposed between a portion of said valve stem guide and said valve head of said poppet valve for urging said poppet valve against said valve seat.

19. The fuel system of claim 15 wherein said valve seat is separately assembled to said valve body.

20. The check valve apparatus of claim 1 wherein said valve seat body has a groove formed within and open to the through passage and said valve seat seal is supported within the groove by only said valve seat body.

* * * * *